United States Patent [19]

Nishimura et al.

[11] Patent Number: 5,588,842
[45] Date of Patent: Dec. 31, 1996

[54] KARAOKE CONTROL SYSTEM FOR A PLURALITY OF KARAOKE DEVICES

[75] Inventors: Osamu Nishimura; Hiroshi Nishikawa, both of Nagoya, Japan

[73] Assignees: Brother Kogyo Kabushiki Kaisha, Nagoya; Xing Inc., Aichi-ken, both of Japan

[21] Appl. No.: 417,389

[22] Filed: Apr. 5, 1995

[30] Foreign Application Priority Data

Apr. 6, 1994 [JP] Japan .................................. 6-093696

[51] Int. Cl.$^6$ .............................. G09B 5/00; G10H 1/36
[52] U.S. Cl. ..................... 434/307 A; 434/318; 434/365; 84/609; 348/478
[58] Field of Search ................................ 434/307 R–309, 434/318, 365; 84/423 R, 454, 477 R, 601, 609–611, 615, 625, 645; 369/32, 48, 50; 360/19.1, 33.1, 77.01; 348/8, 478, 484, 571, 595, 738; 358/310, 311, 341, 342, 335

[56] References Cited

U.S. PATENT DOCUMENTS

| | | | |
|---|---|---|---|
| 4,896,209 | 1/1990 | Matsuzaki et al. | 348/8 |
| 5,153,917 | 10/1992 | Kato | 434/307 A X |
| 5,194,682 | 3/1993 | Okamura et al. | 434/307 A |
| 5,250,757 | 10/1993 | Tsumura | 434/307 A |
| 5,319,452 | 6/1994 | Funahashi . | |
| 5,335,073 | 8/1994 | Yamamoto | 434/307 A |
| 5,473,106 | 12/1995 | Miyashita et al. | 84/609 |

FOREIGN PATENT DOCUMENTS

| | | | |
|---|---|---|---|
| 2276754 | 10/1994 | United Kingdom | 434/307 A |
| 2276971 | 10/1994 | United Kingdom | 434/307 A |
| 2278227 | 11/1994 | United Kingdom | 434/307 A |

*Primary Examiner*—Joe Cheng
*Attorney, Agent, or Firm*—Kane, Dalsimer, Sullivan, Kurucz, Levy, Eisele and Richard, LLP

[57] ABSTRACT

When images of the image genre most suitable for the selected song are being reproduced (Yes in S14), the karaoke terminal picks up those image data from a channel over which they are transmitted. If images of that image genre are not being reproduced (No in S14), when the number of players presently playing is less than four (No in S19), a player that is not presently playing starts playing a video disk to reproduce images of that image genre in S20. When the number of players presently playing is equal to or greater than four, according to the image genre D and/or H reproducing status, a player that is not presently playing starts playing a video disk to reproduce images of image genre D or H that includes or is common to the most suitable image genre.

13 Claims, 4 Drawing Sheets

KARAOKE CONTROL SYSTEM FOR A PLURALITY OF KARAOKE DEVICES

BACKGROUND OF THE INVENTION

1. Field of the Invention

The present invention relates to a karaoke control system for controlling a plurality of karaoke devices to perform karaoke. Karaoke is a type of entertainment where users sing songs in time with accompaniment music while reading lyrics of the songs on a monitor screen. The lyrics are displayed on the monitor screen superimposed on background images.

2. Description of the Related Art

Music data for several thousand songs is required per commercial karaoke unit to meet requests of customers. Therefore many video disks storing music data by songs are required. These plurality of video disks are housed in a special housing case. A disk is selected and reproduced by an automatic changer (referred to as autochanger hereinafter) according to a request. The special housing case and the autochanger occupies a great amount of space. This space is inefficiently used from a business perspective and could be put to better use, such as to form an additional room in a karaoke establishment where rooms for singing karaoke in private are rented out. There has been a demand for more compact commercial karaoke units.

Many karaoke systems with centralized management have been provided in recent years to fill this need. One such centrally managed karaoke system has a plurality of terminals and a central control portion where video disks and auto-changers are situated. The central control portion receives a request signal transmitted from a terminal and transmits image data and music data that matches the request signal back to the terminal. However, in such a centrally managed karaoke system also, a large area is occupied in the central management room when the image data and music data is attempted to be located in the central management room. To solve this problem, U.S. Pat. No. 5,319,452 has proposed a control system for controlling music accompanying devices for saving space.

According to the control system for controlling music accompanying devices, music data and image data are stored separately. Sets of image data are stored categorized by the different genre of the music data. The central control portion continuously outputs the sets of image data. Each terminal selects the set of image data most appropriate for any particular selected music data. By storing the music data separated from the image data, the storage capacity for image data can be reduced. The size of the device and the space it takes up can also be reduced.

With the example described above, however, because one song is about four minutes long, image data sufficient for only 14 to 15 Japanese ballads and the same number of popular songs is provided on the one video disk, for example. Therefore, a person singing a great number of songs will possibly tire of seeing the same background image. Further, the displayed image corresponding to the first portion of the song leaves a particularly strong impression. Therefore, when only 14 to 15 image patterns are available for either Japanese ballads or popular songs, users of karaoke will possibly get the impression that the background images are always the same.

In a separate problem, when songs are thus divided into only two image genres (i.e., corresponding to Japanese ballads and popular songs), invariably some background images will be inappropriate for the content or gist of the song being sung. Although Japanese ballads can be handled with a comparatively small number of images, popular songs must include images for a great variety of song types including animation film songs, children's songs, folk songs, blues, rock and roll, movie theme songs, etc. Also, only 14 to 15 image patterns can not cope well with all situations, such as when a summer scene appears during a song about winter or when a tranquil scene appears during a up-tempo song.

This problem can be solved by dividing or classifying images finely into an increased number of image genres so as to prepare image data better matching the content of each song. In other words, the images can be divided into further image genre so as to better match the content of each song. However, if, for example, the songs are divided into about ten genre, more than a predetermined number of image patterns has to be provided for each genre, in order not to give users of karaoke a strong impression of the same images being repeatedly shown. This, however, leads to an increase in the total number of image data, which is contrary to the demand for more compact devices.

In another separate problem, video disks used in single-standing karaoke devices can not be used in the centrally controlled karaoke system described in the U.S. Pat. No. 5,319,452. Therefore, special video disks must be produced for this system, which increases the costs of the video disks for the system.

SUMMARY OF THE INVENTION

It is an objective of the present invention to overcome the above-descried problems and provide a karaoke control system capable of displaying background images that are much appropriate for a great many sets of music data while using a limited amount of image data, without displaying background images inappropriate for the music data even when the most appropriate background image can not be displayed.

It is another objective of the present invention to provide a karaoke control system capable of using video disks used in single-standing karaoke devices, thereby reducing costs of video disks.

In order to attain the above objectives and other objectives, the present invention provides a karaoke control system for controlling a plurality of karaoke devices to play accompaniment music of desired songs while displaying lyrics of the desired songs and background images suitable for the desired songs, the karaoke control system comprising: a central control device including song data storing means for storing song data for a plurality of songs, the song data for each song including music data representative of an accompaniment music of the corresponding song and lyric data representative of lyrics of the corresponding song, the song data being added with image genre data representative of an image genre most suitable for the corresponding song; and a plurality of karaoke devices connected to the central control device via a transmission line, each of the plurality of karaoke devices including song selecting means for selecting a song desired to be sung out of the plurality of songs, wherein the central control device further includes: song data retrieving means for retrieving song data for the songs selected at the karaoke devices; a plurality of image data memory means for storing a plurality of image data groups of a plurality of image genres, each image data group being made from two or more image data edited to represent images of a corresponding image genre, and at least one image data group of at least one common image genre, each common image genre being common to several ones of the plurality of image genres, the image data group of each common image genre being made from two or more image data edited to represent images of a corresponding common image genre; a plurality of image data retrieval means for retrieving image data from the plurality of image data memory means; image genre determination means for determining image genres most appropriate for the selected songs, based on the image genre data added to the song data retrieved for the selected songs; control means for controlling the image data retrieval means to retrieve image data from the plurality of image data memory means, the control means controlling each of the image data retrieval means to retrieve image data from one of an image data group of the determined image genre and an image data group of a common image genre that is common to the determined image genre; and transmission means for transmitting the retrieved song data and the retrieved image data to the karaoke devices, and wherein each of the plurality of karaoke devices includes: music play means for receiving the music data included in the transmitted song data and for playing accompaniment music based on the song data; and image reproduction means for receiving the lyric data included in the transmitted song data and the transmitted image data, for combining the lyrics represented by the lyric data and the images represented by the image data as background images, and for displaying the combined images.

According to another aspect, the present invention provides a karaoke control system for controlling a plurality of karaoke devices to play accompaniment music of desired songs while displaying lyrics of the desired songs and background images suitable for the desired songs, the karaoke control system comprising: a central control device and a plurality of karaoke devices connected to the central control device via a transmission line, wherein the central control device includes: a song data storing unit for storing song data for a plurality of songs, the song data for each song including music data representative of an accompaniment music of the corresponding song and lyric data representative of lyrics of the corresponding song, the song data being added with image genre data representative of an image genre most suitable for the corresponding song; a plurality of image data memories for storing a plurality of image data groups of a plurality of image genres, each group being formed from two or more sets of image data edited to represent images of a corresponding image genre, and at least one common image data group, each group being formed from two or more sets of image data edited to represent images of a corresponding common image genre that is common to several ones of the plurality of image genres; and a plurality of image data retrieving units for retrieving image data from the plurality of image data memories; wherein each of the plurality of karaoke devices includes a song selecting unit for selecting a song desired to be sung out of the plurality of songs, wherein the central control device further includes: a song data retrieving unit for retrieving song data for the songs selected at the karaoke devices from the song data storing unit; an image genre distinction unit for distinguishing image genres most appropriate for the selected songs, based on the image genre data added to the song data retrieved for the selected songs; a control unit for controlling the image data retrieval units to retrieve image data from the plurality of image data memories, the control unit controlling each of the image data retrieval unit to retrieve image data of an image data group of the distinguished image genre, the control unit compulsorily controlling at least one of the plurality of image retrieval units to retrieve image data of an image data group of a common image genre common to the distinguished image genre, regardless of what image genre is distinguished by the image genre distinguishing unit, when the number of image genres distinguished by the image genre distinguishing unit increases to a value close to the number of image data retrieval units; and a transmission unit for transmitting the retrieved song data and the retrieved image data to the karaoke devices.

The plurality of image data retrieval units may be serially operated when various songs are selected by the plurality of karaoke devices.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENT

Figure 1:
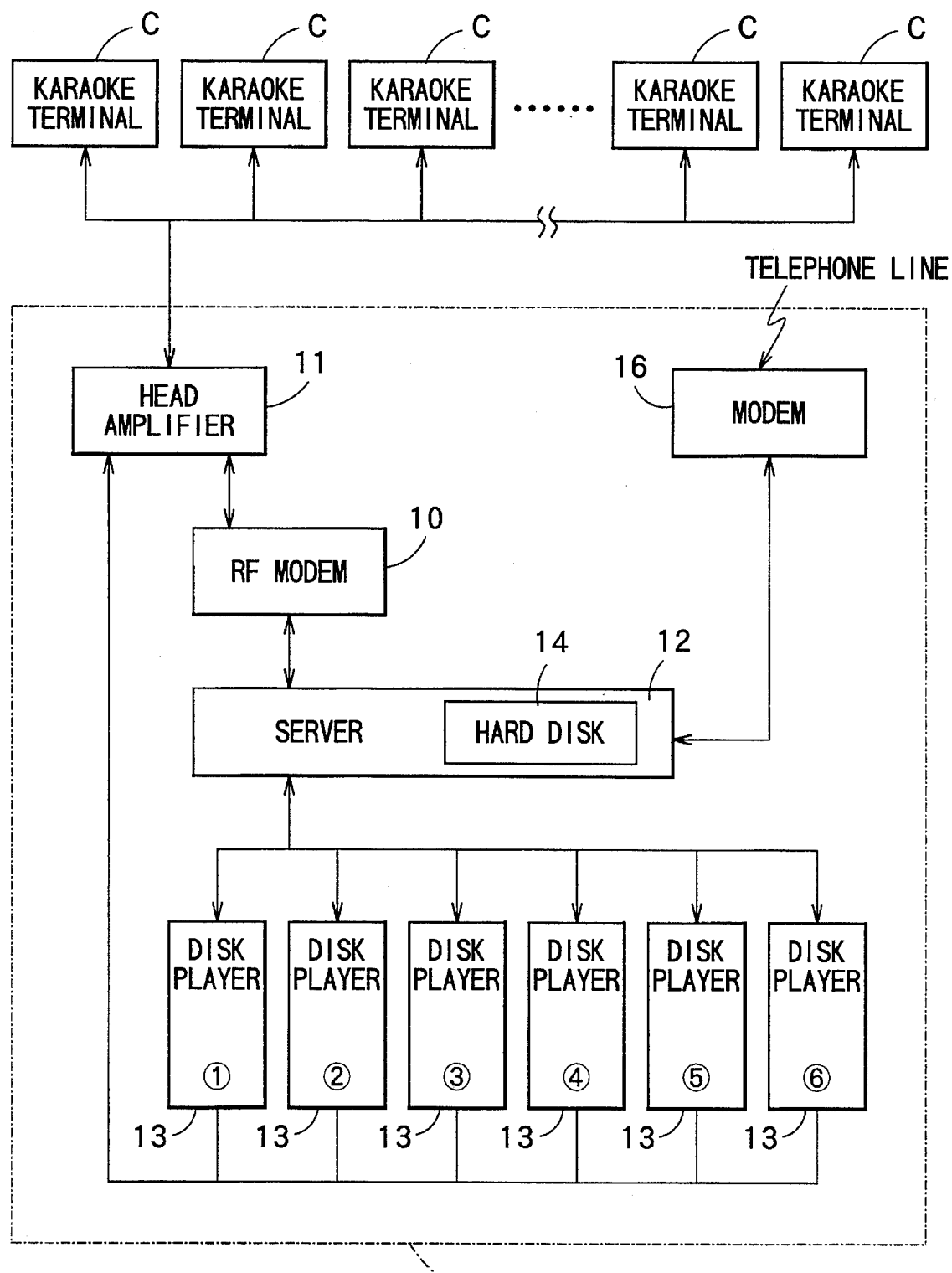
FIG. 1 is a block diagram schematically showing a configuration of a central control portion L of a karaoke control system according to a preferred embodiment of the present invention.

A karaoke control system for controlling a plurality of karaoke devices according to a preferred embodiment of the present invention will be described while referring to the accompanying drawings wherein like parts and components are designated by the same reference numerals to avoid duplicating description.

A structure of a control system of the embodiment will be described below with reference to FIGS. 1 through 3.

As shown in FIG. 1, the karaoke control system is constructed from a central control portion L and a plurality of karaoke terminals C connected to the central control portion L via a transmission cable. In the present embodiment, the transmission cable is a coaxial cable for transmitting radio frequency (which will be referred to as RF hereinafter) signals such as RF information signals designating karaoke songs selected at the terminals C and RF signals for image data and song data for the selected karaoke songs.

The central management control portion L includes: a modem 16; an RF modem 10; a head amplifier 11; a server 12 having a hard disk 14 installed therein; six disk players 13; and the like.

The server 12 is for performing overall control of the central management control portion L. Two identical servers 12 may be provided in the present embodiment. In this case, the central management control portion L can continue to function even if one stops operating.

The hard disk 14 installed in the server 12 is a memory unit for storing song data (digital data) of a plurality of karaoke songs which are selectable by the user to be sung at each karaoke terminal C. The song data for each of the plurality of karaoke songs includes instrumental accompaniment data (referred to as music data hereinafter) for being played by a sound source of a karaoke terminal, and lyric data for being projected on a monitor television of a karaoke terminal C. The music data is in the form according to a musical instrument digital interface (MIDI) standard.

The music data for each song is added with image genre data representative of an image genre of background images most appropriate for the music data. This image genre data indicates the image genre that most properly matches the tone, content, and gist of the corresponding song.

The plurality of songs stored in the hard disk 14 can be categorized according to various aspects. In the present embodiment, the plurality of songs are categorized mainly into two types of songs, that is, blues songs and pop songs. Blues songs are classified into four song genres: Blues songs with a winter theme; Blues songs with a theme about drinking liquor; Blues songs with a theme about the ocean; and Blues songs with other themes. Pop songs are classified into four song genres: Pop songs with an up-tempo theme; pop songs with a slow tempo theme; animation or children songs; and other pop songs.

In correspondence with this song classification, image genre are categorized into the following eight image genres A through H. Genre A contains images that correspond to blues songs with a winter theme. Genre B contains images that correspond to blues songs with a theme about drinking liquor. Genre C contains images that correspond to blues songs with a theme about the ocean. Genre D contains images that correspond to blues songs with general themes. In other words, genre D is common to all the genres A–C. Images of genre D can therefore correspond to all types of blues songs, including blues songs with a winter theme, with a theme about drinking liquor, with a theme about the ocean, and with other themes.

Genre E contains images that correspond to up-tempo pop songs. Genre F contains images that correspond to slow-tempo pop songs. Genre G contains images that correspond to animation or children songs. Genre H contains images that correspond to pop songs with general themes. In other words, genre H is common to all the genres E–G. Images of genre H can therefore correspond to all the types of pop songs, including up-tempo pop songs, slow-tempo pop songs, animation or children songs, and other pop songs.

Image genre data added to the music data for each song therefore indicates which of the image genres A through H can match the content and gist of the each song to a great degree. In other words, the image genre data indicates which of the image genres A through H is most appropriate for a corresponding song. It is noted that image genre D can also match, to a certain degree, the contents and gists of those songs that are added with image genre data of image genres A–C. It is also noted that image genre H can also match, to a certain degree, the contents and gists of those songs that are added with image genre data of image genres E–G.

The RF modem 10 is for modulating song data (digital data) retrieved from the hard disk 14 into a radio frequency signal (referred to as a RF song signal hereinafter) for being transmitted via the head amplifier 11 over the transmission cable to the terminals C. The RF modem 10 is also for receiving an RF information signal that indicates a song selected at a karaoke terminal C and that has been transmitted via the head amplifier 11 from the terminal, for demodulating the RF information signal into digital information data, and for supplying the digital information data to the server 12.

The modem 16 is for modulating various information data, such as information data on the frequency at which respective songs are selected at the terminals C, into information signals for being transmitted to a host computer (not shown) via a telephone line. To constantly supply the control system with the newly released songs, the host computer transmits song data (digital data) of the newly released songs to the central management control portion L over the telephone line at night via the modem 16. The song data are then stored in the hard disk 14. It is noted that when the amount of song data stored in the hard disk 14 exceeds the memory capacity of the hard disk, data for infrequently selected songs is removed from the hard disk 14 and the data for new songs is stored in its place.

Each of the six disk players 13 is for retrieving image data from image reproduction disks and for modulating the image data into radio frequency signals (which will be referred to as RF image signals hereinafter). The six players 13 are numbered (1) through (6).

The head amplifier 11 includes a variety of devices (not shown) such as a mixer for mixing signals inputted thereto and outputting the mixed signals via the transmission cable to the karaoke terminals C. The head amplifier 11 has inputted thereto RF song signals and RF image signals, multiplexes the RF song signals and the RF image signals, and outputs them to the coaxial cable, along which the multiplexed RF signals are transmitted to the karaoke terminals C.

The server 12 which is the core of the control of the central management portion L performs various operations. The server 12 retrieves song data from the hard disk 14, based on information signals that designate songs selected at the terminals C and transmitted from the terminals C. The server 12 determines an image genre most appropriate for the selected song, based on the image genre data added with the retrieved song data. The server 12 transmits the retrieved song data (as the RF song signal) via the head amplifier 11 to the karaoke terminal C. The server 12 performs a disk player control operation, as will be described later, so as to supply karaoke terminals C with images of image genres appropriate for the songs selected at the terminals C. The server 12 informs each karaoke terminal C of image genre presently transmitted through each channel at the coaxial cable. The server grasps and manages the operation status of each karaoke terminal C.

Figure 2:
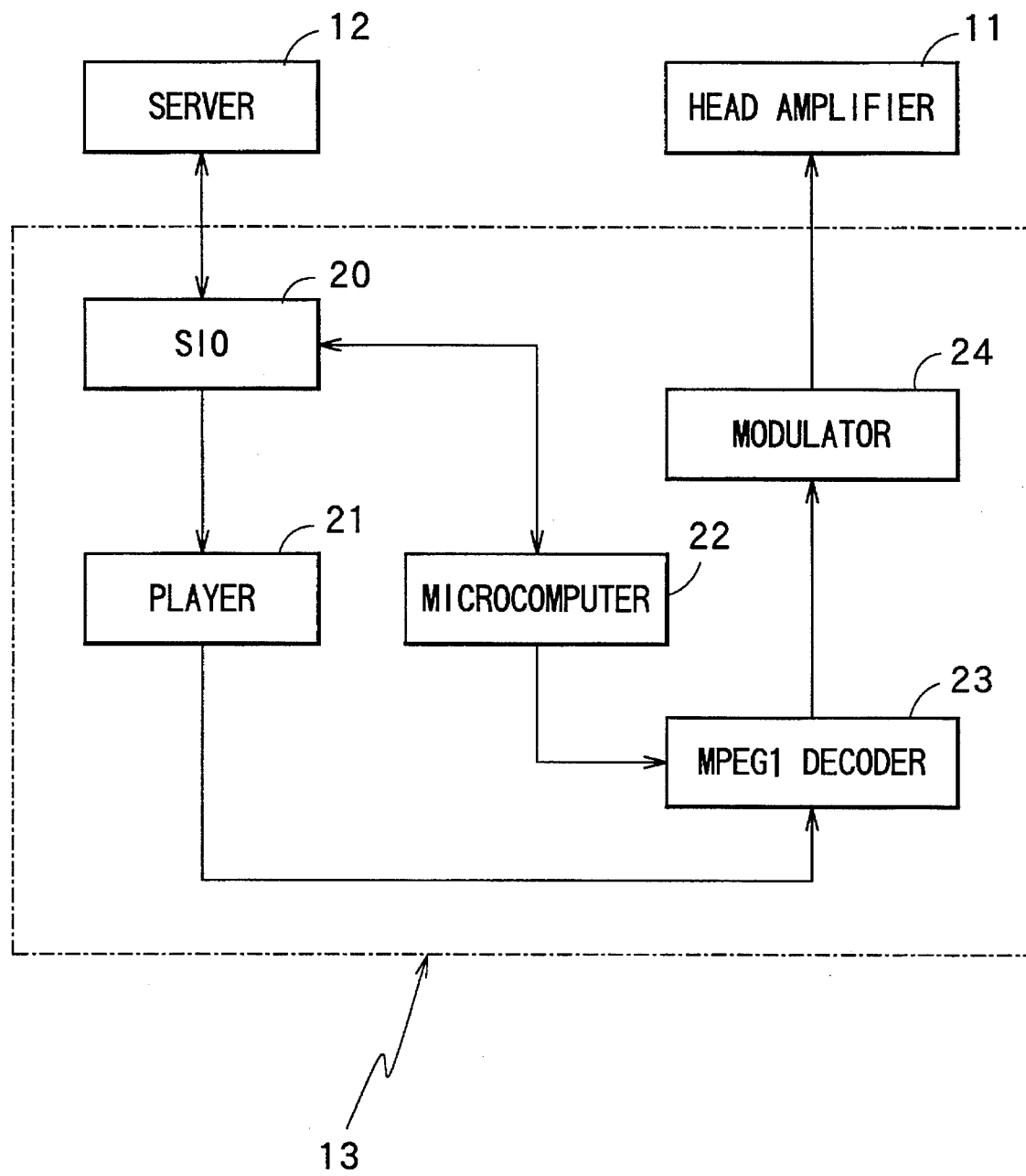
FIG. 2 is a block diagram schematically showing a configuration of each of the disk players 13 of the karaoke control system of FIG. 1.

Next, an explanation will be provided for each disk player 13 while referring to FIG. 2.

The disk player device 13 includes a serial input/output circuit (SIO) 20, a disk changeable player 21, a microcomputer 22, a MPEG1 decoder 23, a modulator 24, and the like.

The serial input/output circuit (SIO) 20 is an interface circuit for receiving the information on the image genre appropriate for the selected song sent from the server 12 and for transmitting the information to the microcomputer 22.

The player 21 is connected to the serial input/output circuit 20. The player 21 is for selecting and reproducing chapters (which will be described later) of appropriate image genre from image reproduction disks. The player 21 includes a changer portion and a player portion (both not shown). Both the changer portion and the player portion are well known. The changer portion houses four image reproduction disks (not shown) and is for changing the reproduction disks according to a command from the microcomputer 22. The player portion is for playing an image reproduction disk changed and set on the player portion.

The image reproduction disks used in the present embodiment are video disks that are the size of a 12 cm compact disk (CD). Image data (video data) is stored in each of the image reproduction disks in compressed form according to Moving Picture Image Coding Experts Group 1 (MPEG1) standards. Because the image data is in compressed form, each CD size disk can contain long period, for example about one hour long images.

In the present embodiment, one group of images is provided for each of the eight image genres A through H. Each image group contains 24 separate edited image data, each edited image data representing a moving picture of 30 seconds long. Each image group therefore contains moving pictures of 12 minutes long in total. Each image group will be referred to as "edited image data group" hereinafter, and each 30 second edited image will be referred to as a "chapter" hereinafter. The chapters in each edited image data group are numbered 1 through 24. Therefore, the chapters in the image group for image genre A, for example, will be referred to as A-1 through A-24. The 24 different chapters in each image genre are edited so that no particular story or plot connects the 24 different chapters.

In the present embodiment, four kinds of image reproduction disks are prepared, in which the edited image data groups of the eight image genres A–H are stored in appropriate allotment. Each of the four kinds of disks therefore stores one or more edited image data group of one or more image genre. In the present embodiment, six different disks storing different edited image data are produced for each of the four kinds of disk. The six different disks for each of the four kinds of disks are stored in the six disk players 13, respectively. Accordingly, the six disk players 13 store therein 24 different disks, in total. In other words, the six disk players 13 store therein 48 different edited image data groups (six different edited image data group for each of the eight image genres).

The microcomputer 22 is for controlling overall operation of the disk player 13 so as to control the changer portion and the player portion to reproduce an image reproduction disk, in which stored is an edited image data group of an image genre appropriate for the selected song.

The MPEG1 decoder 23 is an electrical circuit for decoding the MPEG1-compressed digital data retrieved from the video disk into a NTSC commercial television image signal. The NTSC image signal thus obtained by the MPEG1 decoder 23 is sent to the modulator 24.

The modulator 24 is an electrical circuit for converting the NTSC image signal into an RF image signal of a frequency band of one of a plurality of channels of the coaxial cable. The RF image signal is sent to the head amplifier 11, where the RF image signal is mixed with the RF song signal.

The modulators 24 in the six disk players 13 are controlled by the corresponding microcomputers 22 to modulate the NTSC image signals into RF image signals of different channels (i.e., channels of different numbers). Accordingly, the RF image signals from the six disk players are respectively transmitted to the karaoke terminals C.

Next, each karaoke terminal C will be described with reference to FIG. 3.

Figure 3:
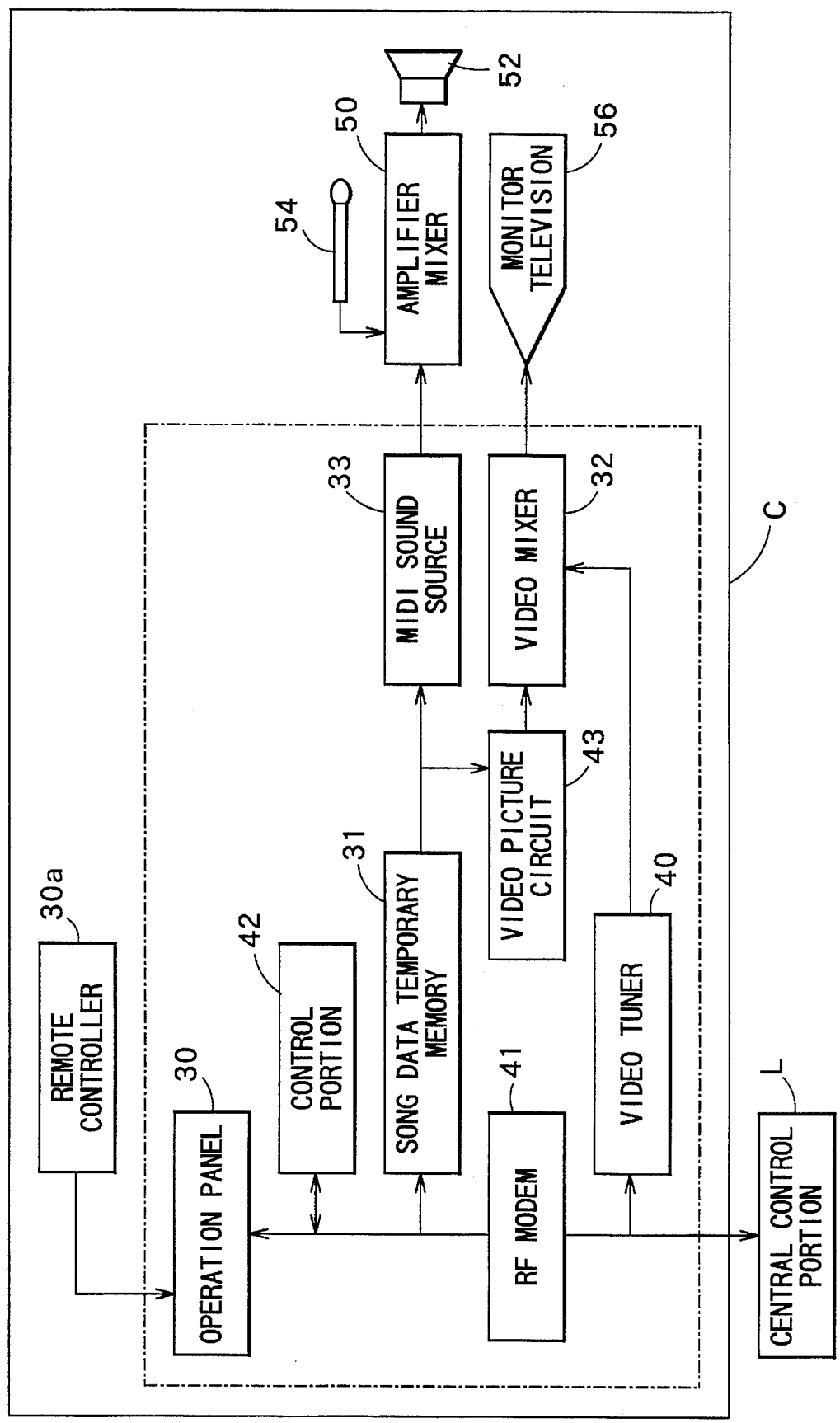
FIG. 3 is a block diagram schematically showing a configuration of each of the karaoke terminals C of the karaoke control system of FIG. 1.

As shown in FIG. 3, each karaoke terminal C includes an operation panel 30, a control portion 42, a RF modem 41, a video tuner 40, a song data temporary memory 31, a MIDI sound source 33, a video picture circuit 43, a video mixer 32, and the like. The karaoke terminal C further includes an amplifier/mixer 50, a speaker 52, a microphone 54, and a monitor television 56.

The control portion 42 is for performing overall control of the karaoke terminal C, and includes well-known components such as CPU, RAM and ROM (not shown). The control portion 42 is constructed from a microcomputer, for example.

The operation panel 30 is for selecting a song desired to be sung by the user, and for adjusting tone of the music. The operation panel 30 is provided with a remote control unit 30a so that a user can select music and perform other operations at a distance from the operation panel 30.

The RF modem 41 is for receiving the RF song signals transmitted from the central control portion L via the coaxial cable and demodulating the RF song signals into digital song data. The song data for the selected song thus obtained by the modem 41 is then temporarily stored in the temporary memory 31. After being temporarily stored in the memory 31, the song data is again retrieved for karaoke performance processes. The karaoke performance processes will be explained later. The RF modem 41 is also for modulating data designating the song selected at the operation panel 30 into RF information signals, and transmits the RF information signals to the central portion L.

The video tuner 40 is for receiving the RF image signals transmitted from the central portion L. The video tuner 40 is controlled by the control portion 42 so as to select a channel over which the RF image signal of image genre appropriate for the selected song is being transmitted.

The data temporary memory 31 is a memory device connected to the RF modem 41 and is for temporarily storing song data transmitted from the head amplifier 11. Entire song data of the selected song is first stored in the data temporary memory 31. Then, parts of the song data are successively retrieved from the memory 31 for karaoke performance of the corresponding song. More specifically, the lyric data and the music data constituting the song data are synchronously outputted from the data temporary memory 31 to be supplied to the video picture circuit 43 and the MIDI sound source 33, respectively. According to this structure, it is possible to complete data transmission from the central control portion L to the terminals C within a short period of time, thereby enabling only the single server 12 in the karaoke central control portion L to supply song data to all the karaoke terminals C. It is noted that the song data stored in the memory 31 is updated every time when the song selecting operation is achieved at the operation panel 30 and the corresponding song data is transmitted from the control portion L.

The MIDI sound source 33 is connected to the temporary memory 31 and is for storing musical sounds of various instruments. The MIDI sound source 33 is a sound source for producing music signals of various instruments, based on the music data successively retrieved from the temporary memory 31. The MIDI sound source 33 sends instrument music signal produced therein to the amplifier/mixer 50.

The microphone 54 is for producing a singing voice signal when a user sings into the microphone.

The amplifier mixer 50 is for amplifying the inputted instrument music signal, for mixing the amplified music signal and the singing voice signal inputted from the microphone 54, and for producing a sound signal. The amplifier mixer 50 is provided with a panel touch key and an operation knob for adjusting, for example, echo, volume, tone, and balance between music and voice volume.

The video picture circuit 43 is for receiving lyric data successively retrieved from the data temporary memory 31 and for converting the lyric data into lyric image signals.

The video mixer 32 is connected to the tuner 40, the video picture circuit 43, and the television monitor 56. The video mixer 32 is for superimposing lyric image signals successively supplied from the video picture circuit 43 onto the RF image signal successively sent from the tuner 40. The video mixer 32 tints lyrics that are displayed on the monitor television 56 in synchronization with output of the instrumental music so that the user knows which part of the music is being played.

Next, disk player control processes performed by the server 12 of the central control portion L will be described below.

To summarize, in this control processes, the server 12 first distinguishes image genre most appropriate for the selected song, based on the image genre data included in the song data. The server 12 then detects the playing status of the disk players 13. Based on the detected playing status, the server 12 determines which of the eight image genres A–H should be reproduced and which one of the six disk players 13 should be used for reproducing images of the determined image genre. The server 12 then transmits information on the determined image genre to the determined disk player 13. In the disk player, the microcomputer 22 receives the information on the determined image genre via the SIO 20, and controls the player 21 to reproduce images of the determined image genre. According to the disk player control processes, the server 12 controls at least two disk players 13 into a condition capable of reproducing images of image genre D appropriate for all the types of blues songs and into a condition capable of reproducing images of image genre H appropriate for all the types of pop songs.

The disk player control process will be described in greater detail below with reference to FIG. 4.

The server 12 in the central control portion L starts performing this control process, when a power switch on the operation panel 30 in at least one karaoke terminal C is turned ON. This control process is repeatedly executed until song stop keys on the operation panels 30 are manipulated at all the terminals C and all the terminals C are turned OFF.

When a karaoke user turns ON any karaoke terminal C and operates the operation panel 30 of the karaoke terminal C to select a song he or she wants to sing, the data (RF information signal) designating the selected song is transmitted from the terminal C to the central control portion L over the transmission cable. Accordingly, in this control process, first, the server 12 determines whether or not information on the selected song has been received from any karaoke terminal C is determined in S10. If not (i.e., S10 is NO), the routine enters a standby condition until input is determined (i.e., S10 is YES), whereupon in S12 song data corresponding to the selected song is retrieved from the hard disk 14 and the image genre data is retrieved from the music data portion of the song data so that the image genre is distinguished. Once the image genre that the song data falls into is distinguished, whether or not one of the disk players 13 is presently reproducing image data from the same genre is determined in S14.

When it is determined that one of the disk players 13 is reproducing image data from the same genre (i.e., S14 is YES), it is determined in S16 that image data thus being reproduced from this disk player should be used, without causing another disk player to operate. Accordingly, the server 12 transmits to the terminal C an information signal on the channel number over which the RF image signal reproduced from the disk player is being transmitted along the transmission cable. The information signal is transmitted via the RF modem 10 and the head amplifier 11 through the coaxial cable. Upon receiving this information signal, the control portion 42 of the karaoke terminal C operates the tuner 40 to receive the channel over which the RF image signal of the image genre is transmitted and to use the received RF image signal as a background image. This routine prevents redundant operation of disk players 13 to reproduce the same genre of image so that the disk players 13 can be effectively used.

On the other hand, when no disk players 13 is reproducing the same genre of image data (i.e., S14 is NO), the number of the disk players 13 presently being operated is determined. If three disk players or less is being operated (No in S15, No in S17, No in S19), S20 is conducted, where a command is transmitted from the server 12 to cause a presently non-operating disk player 13 with the lowest number to reproduce edited image data of the image genre distinguished by the server 12. For example, if the disk players (1) through (3) are operating, the disk player (4) is caused to reproduce edited image data of the image genre represented by the image genre data. Also in this step S20, the server 12 informs the terminal C of the channel number over which the reproduced image data is to be transmitted, similarly as in S16, so that the terminal C will properly receive the image data.

On the other hand, if four disk players are operating (i.e., No in S15, No in S17 and Yes in S19), the process proceeds to S21, where the server 12 judges whether or not images of at least one of image genres D and H are being reproduced by at least one of the four players. If yes, the process proceeds to S20. If not, the process proceeds to S22. If five disk players are being operated (No in S15, Yes in S17), the process proceeds to S18, where the server 12 judges whether or not images of image genres D and H are both being reproduced by two of the five players. If yes, the process proceeds to S20. If not, the process proceeds to S22. If all the six disk players are being operated (Yes in S15), the process directly proceeds to S22.

In S22, whether or not the image genre data of the song data distinguished by the server 12 represents a pop song is determined. In other words, S22 determines whether or not the distinguished image genre data represents any of the image genres E–H. If so (i.e., S22 is YES), whether or not one of the disk players 13 is presently reproducing images appropriate for all pop songs (i.e., genre H) is determined in S24. If none of the presently operating disk players 13 is reproducing images of image genre H (i.e., S24 is NO), a command is sent to a presently non-operating disk player 13 with the lowest number to reproduce images of image genre H, regardless of whether image genre distinguished by the server 12 is the same as image genre H. Then the disk player 13 reproduces images of image genre H in S26. Also in S26, the server 12 informs the terminal of the channel number over which the image data of image genre H is to be transmitted, similarly in S16.

On the other hand, if one of the disk players 13 is determined to be reproducing images of image genre H (i.e., S24 is YES), it is determined that images of image genre H thus being reproduced from this disk player should be used, without causing another disk player to operate, in S28. Accordingly, the server 12 informs the terminal of the channel number over which the image data of image genre H is being transmitted.

In the present embodiment, because songs are divided into two main groups of blues songs and pop songs and because image genre are prepared accordingly, when image genre data as distinguished by the server 12 is determined in S22 not to be image genre data that represents pop music (i.e., S22 is NO), then that means the image genre data included in the music data represents a blues song (that is, any of the image genres A–D). Next, whether or not one of the disk players 13 is reproducing the general genre for blues songs, that is, image genre D, is determined in S30. If none of the disk players 13 is reproducing image genre D (i.e., S30 is NO), a command is sent to a presently non-operating disk player 13 with the lowest number to reproduce images of image genre D, regardless of whether image genre distinguished by the server 12 is the same as image genre D. Then the disk player 13 reproduces images of image genre D in S32. Also in this S32, the server 12 informs the terminal of the channel number over which the image data of image genre D is to be transmitted.

On the other hand, if one of the disk players 13 is determined to be reproducing images of image genre D (i.e., S30 is YES), it is determined that images of image genre D being reproduced from this disk player should be used, without causing another disk player to operate, in S34. Accordingly, the server 12 informs the terminal of the channel number over which the image data of image genre D is being transmitted.

In the above-described operation, two of the six disk players are always controlled in a condition capable of reproducing images of image genre D and H. Accordingly, when all the six disk players are operating, two disk players are always reproducing images of image genres D and H. Accordingly, when an affirmative judgement is conducted in S15, S34 or S28 is always conducted.

Two of the six disk players 13 are thus made available for reproducing the pop song general image genre H and the blues song general image genre D, for the following reason. The edited image data of each of the image genres A–C and E–G is prepared in order to match the corresponding song data. Therefore, background images from each of the image genres A–C and E–G will poorly match a song from a different genre. According to the present invention, image reproduction disks, that store data on images of image genre D appropriate for all blues songs and data on images of image genre H appropriate for all pop songs, are provided to each of the six disk players 13. These image reproduction disks are located at least two disk players 13 in a condition capable of being reproduced at any time. Therefore, background images in harmony with the selected song can be provided, even if the remaining four disk players 13 are all operated to reproduce images from other image genre A–C and E–G.

The central control system having the above-described structure operates, as will be described below.

Figure 4:
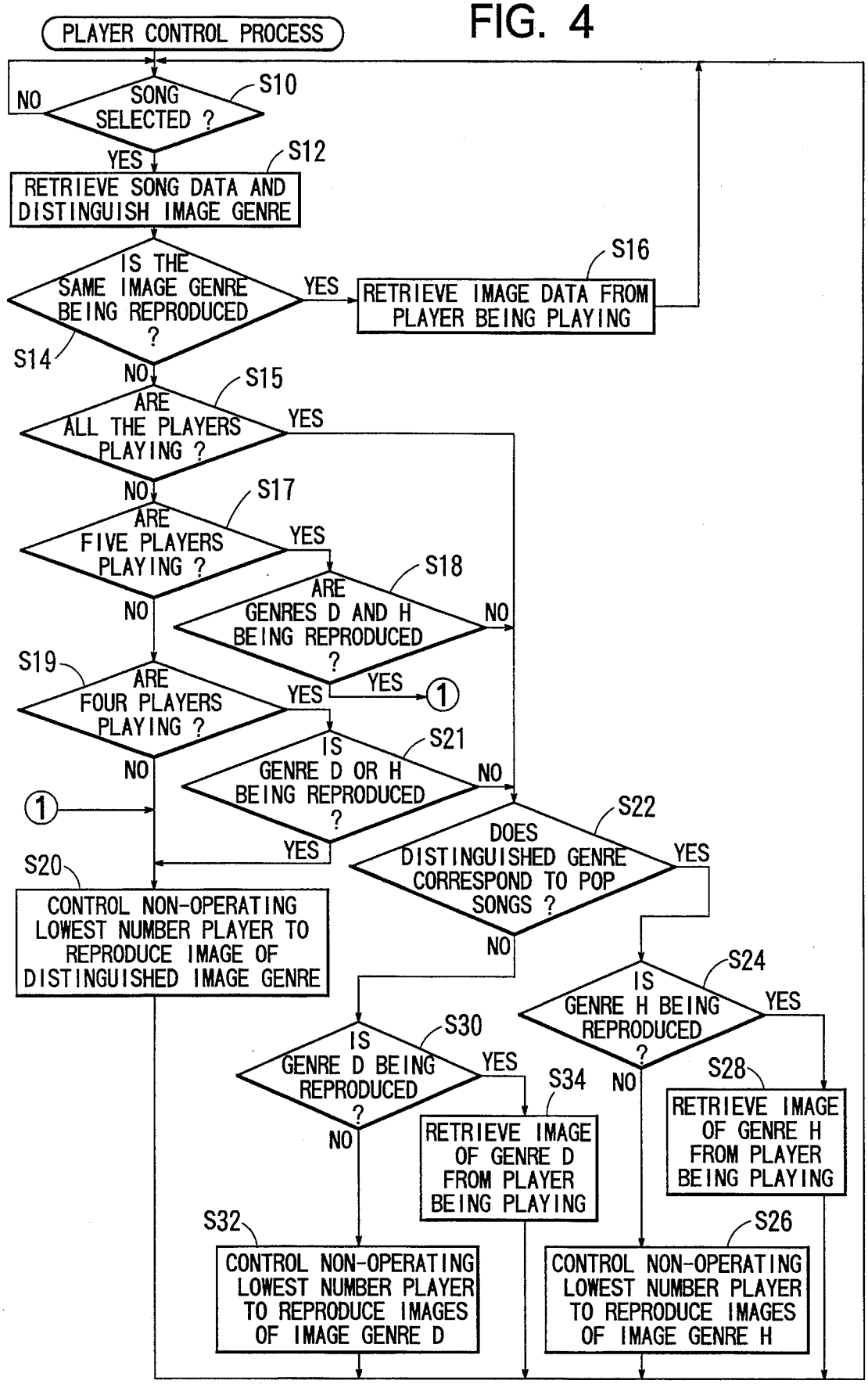
FIG. 4 is a flowchart showing control routine performed by the server 12 for controlling the disk players 13.

When at least one terminal C is turned ON, the central control portion L starts performing the player control processes shown in FIG. 4. When a karaoke user operates the operation panel 30 of the karaoke terminal C to select a song he or she wants to sing, the data designating the selected song is transmitted from the terminal C to the central management portion L over the transmission cable. At the central management portion L, the server 12 retrieves the song data of the selected song from the hard disk 14. Then, the server 12 determines the image genre most suitable for the selected song, based on the image genre data added to the music data of the retrieved song data. Then, the server 12 performs one of the steps S16, S20, S32, S34, S26 and S28, according to the playing status of the disk players 13. The server 12 transmits a command to one of the disk players so as to control the disk player to supply edited image data of the distinguished image genre in S20 or edited image data of image genre D or H that includes or is common to the distinguished image genre in S32 and S26. For example, when the user selects a blues song with winter theme, because the image genre data for this song indicates that image genre A is most suitable for the selected song, the server 12 controls one of the disk players to supply edited image data of image genre A or edited image data of image genre D that includes or is common to the image genre A.

In the disk player, the microcomputer 22 performs overall control of the disk player, in response to commands transmitted from the server 12. That is, the microcomputer 22 controls the player 21 to set an image reproduction disk, in which images of the image genre determined to be reproduced are stored, and to retrieve the edited image data from the image reproduction disk. The MPEG1 decoder 23 decodes the edited image data into NTSC image signals. The modulator 24 converts the NTSC image signals into a RF image signal of one channel. The RF image signal is supplied to the head amplifier 11.

The song data retrieved from the hard disk 14 is modulated into an RF song signal by the RF modem 10, before being supplied to the head amplifier 11. The head amplifier 11 mixes the RF song signal and the RF image signal, and transmits them to the karaoke terminals C.

The server 12 informs the karaoke terminal C that has requested the song of the channel over which the RF image signals appropriate for the song are transmitted. The control portion 42 in the karaoke terminal therefore controls the tuner 40 to receive the image signals from that channel.

In the terminal, the RF song signal is demodulated by the RF modem 41 into digital song data before being temporarily stored in the data temporary memory 31. The lyric data of the song data is then successively retrieved from the memory 31 in synchronization with the RF image signal transmitted to the tuner 40. The video picture circuit 43 converts the lyric data into lyric image signals. The video mixer 32 superimpose the lyric image signals on the RF image signals. The thus obtained composite image signals formed from the lyric image signals and the RF image signals is displayed on the monitor television 56. The user then sings the song while referring to the lyrics appearing on the monitor television 56. The image signals appear on the television monitor 56 as background images that match the content of the selected song. Therefore, the atmosphere of the karaoke experience is delightful. Music data is successively retrieved from the data memory 31 in synchronization with the image signals and the lyric data. The music data is supplied to the MIDI sound source 33 and is transformed into analog instrumental music signals. The analog music signals are sent to the amplifier/mixer 50 where they are electrically amplified and mixed at an appropriate rate with the voice of the user who is singing the song into the microphone 54 in time with the music while referring to the lyrics. The signals with the music and voice mixed therein are outputted by the speaker 52 as a musical performance.

As described above, according to the embodiment, when images of the image genre most suitable for the selected song are being reproduced (Yes in S14), the karaoke terminal picks up those image data from a channel over which they are transmitted. If images of that image genre are not being reproduced (No in S14), when the number of players presently playing is less than four (No in S19), a player that is not presently playing starts playing a video disk to reproduce images of that image genre in S20. When the number of players presently playing is equal to or greater than four, according to the image genre D and/or H reproducing status, a player that is not presently playing starts playing a video disk to reproduce images of image genre D or H that includes or is common to the most suitable image genre.

As described in detail above, eight types of image genres that match the content, tone, and gist (genre) of music data are provided to the karaoke central control system of the present embodiment. Therefore, by reproducing images of image genre most appropriate for the music data, a background image that matches the contents, gists, and tone of the music data can be displayed, so that users will not feel any sort of discord.

While reproducing images of image genre distinguished by the server 12, the server 12 controls one of the six disk players 13 to reproduce images of image genre D (general genre for all blues songs) and another one to reproduce images of image genre H (general genre for all pop songs). Therefore, edited image data appropriate for all blues songs or for all pop songs can be always provided as background at any time.

If all six of the disk players 13 are reproducing images of image genre that can not be used except with certain song genre, there will possibly occur the cases that none of the image genre being reproduced will correspond to the song selected next. For example, when all the six disk players are reproducing image genres A–C and E–G, if a blues song with theme other than a winter theme, a theme about drinking liquor, or a theme about the ocean is selected next, any of the image genres A–C and E–G can not match the selected song. In this case, the program has to wait until one of the disk players 13 completes reproduction so as not to reproduce edited image data of an image genre mismatched with the selected song. According to the present invention, however, two of the disk players are always brought into a condition capable of reproducing images general to blues songs and pop songs and therefore can properly match any types of songs. The program therefore does not have to wait until one of the disk players 13 completes reproduction.

In the present invention, compact disks for general self-standing karaoke devices can be used as image reproduction disks for storing images appropriate for respective songs. In more concrete terms, in addition to or in place of the above-described image reproduction disks storing the image genres A–H, it is possible to use compact disks for general self-standing karaoke devices which can also be classified into those image genres A–H. There is no need to produce individual image reproductions disks as is the case of conventional karaoke central management devices. The costs of image reproduction disks can be reduced as a result.

Additionally, in the above-described embodiment, not only do the eight types of edited image data groups provided to each image reproduction disk have different content, but so also do edited image data groups of image reproduction disks of each disk player. Therefore, the six disk players 13 contain a total of 48 different types of edited image data groups. Accordingly, the same background images will not be displayed on the monitors in the terminals.

While the invention has been described in detail with reference to specific embodiment thereof, it would be apparent to those skilled in the art that various changes and modifications may be made therein without departing from the spirit of the invention, the scope of which is defined by the attached claims.

For example, in the present embodiment, modulators are provided to the disk player 13, respectively. However, a single modulator can be provided to another portion of the central management portion L. In the present embodiment, each disk player is provided with a single player. However, each disk player can be provided with two players. These allow downsizing the central management portion which places less restrictions on the site where the central management portion is installed.

Also, when space allows, more than six disk players 13 can be provided so that a greater variety of background images can be provided. By providing fewer disk players 13 less space is required. Further, the image genre indicated in the present embodiment are only examples. By further subdividing and categorizing the background images, song data can be more closely matched.

As described above, according to the present invention, when a desired song is selected from a plurality of songs at a karaoke device, the information designating the selected song is transmitted to the central control device. Simultaneously with transmission of music data from the central control device to the karaoke device, the image genre data added to the selected music data is retrieved. The plurality of image data retrieving units, such as a plurality of disk players, retrieve edited image data from the plurality of image data memories such as video disks, according to the retrieved image genre data.

A plurality of edited image data groups, each group formed from two or more sets of edited image data edited to a single image genre, is stored in the plurality of image data memories. The image data memories store edited image data groups of various image genres that are most appropriate for the plurality of songs selectable by the karaoke devices, and at least one common edited image data group of image genre common to several image genres.

When the edited image data that corresponds to the selected song data is retrieved from the image data memory, the edited image data is transmitted to the karaoke device via the transmission line and projected with the lyric data on the monitor as image data that corresponds to the music data. Also the selected music data is outputted. Thus, it is possible to project on the monitor of the karaoke device images most appropriate for the selected song.

The central control device are connected to a plurality of karaoke devices and manages all the karaoke devices simultaneously. The image genre data are retrieved from music data of songs selected at the karaoke devices. There is a possibility that the number of image genres distinguished based on the retrieved image genre data will exceed the number of image data retrieving units. In this case, the edited image data of the image genre most appropriate for the selected music data can not be provided. A long time may be required before the most appropriate image is freed up. Users may lose these enthusiasm while waiting. The present invention prevents this from happening by compulsorily retrieving edited image data of common image genre that corresponds to several image genres, regardless of what image genre is distinguished. Therefore, there is no waiting time. Also, the image data and the selected music data will always match to a certain extent.

Normally, based on the content of the desired selected music data, the plurality of image data retrieval units operate serially in a predetermined order for retrieving edited image data from the image memories.

As described above, according to the present invention, edited images of different image genres are stored in image memories such as a plurality of video disks. The edited images are retrieved from the image memories by a plurality of image data retrieving units such as disk players. When desired songs are selected at the karaoke devices, image genres that correspond with the selected songs are distinguished. Normally, the plurality of image data retrieving units are controlled to retrieve edited images of the image genres thus distinguished as appropriate for the selected songs. When the number of the distinguished image genres increases and will exceed the number of image data retrieving units, however, the image retrieving units are compulsorily controlled to retrieve edited images of common image genre that is compatible with several image genres. Therefore, by using a minimum amount of image data, appropriate background images can be displayed for a great deal of music data. Also, when the most appropriate background image can not be displayed, display of background image extremely inappropriate to songs can be avoided. Also, because image memory means can be commonly used for a self-standing karaoke device, the costs for video disks can be reduced.

What is claimed is:

1. A karaoke control system for controlling a plurality of karaoke devices to play accompaniment music of desired songs while displaying lyrics of the desired songs and background images suitable for the desired songs, the karaoke control system comprising:

a central control device including song data storing means for storing song data for a plurality of songs, the song data for each song including music data representative of an accompaniment music of the corresponding song and lyric data representative of lyrics of the corresponding song, the song data being added with image genre data representative of an image genre most suitable for the corresponding song; and a plurality of karaoke devices connected to the central control device via a transmission line, each of the plurality of karaoke devices including song selecting means for selecting a song desired to be sung out of the plurality of songs, wherein the central control device further includes:

song data retrieving means for retrieving song data for the songs selected at the karaoke devices;

a plurality of image data memory means for storing a plurality of image data groups of a plurality of image genres, each image data group being made from two or more image data edited to represent images of a corresponding image genre, and at least one image data group of at least one common image genre, each common image genre being common to several ones of the plurality of image genres, the image data group of each common image genre being made from two or more image data edited to represent images of a corresponding common image genre;

a plurality of image data retrieval means for retrieving image data from the plurality of image data memory means;

image genre determination means for determining image genres most appropriate for the selected songs, based on the image genre data added to the song data retrieved for the selected songs;

control means for controlling the image data retrieval means to retrieve image data from the plurality of image data memory means, the control means controlling each of the image data retrieval means to retrieve image data from one of an image data group of the determined image genre and an image data group of a common image genre that is common to the determined image genre; and transmission means for transmitting the retrieved song data and the retrieved image data to the karaoke devices, and wherein each of the plurality of karaoke devices includes:

music play means for receiving the music data included in the transmitted song data and for playing accompaniment music based on the song data; and image reproduction means for receiving the lyric data included in the transmitted song data and the transmitted image data, for combining the lyrics represented by the lyric data and the images represented by the image data as background images, and for displaying the combined images.

2. A karaoke control system of claim 1, wherein the control means controls at least one of the plurality of image data retrieval means to retrieve image data from the image data group of the common image genre that is common to the determined image genre, when the number of image genres determined by the image genre determination means increases to a value close to the number of image data retrieval means.

3. A karaoke control system of claim 2, wherein the image data memory means stores the plurality of image data groups of the plurality of image genres and two or more image data groups of two or more common image genres, each of the plurality of image genres being common to either one of the two or more common image genres, the image genre data added to the song data representing an image genre most suitable for the corresponding song and a common image genre common to the image genre represented by the image genre data representing an image genre suitable for the corresponding song.

4. A karaoke control system of claim 3, wherein the control means controls the image data retrieval means of the number of the common image genre into a condition capable of retrieving image data from the image data groups of the common image genres, respectively, while controlling the remaining image data retrieval means into a condition capable of retrieving image data from the image data groups of the image genres determined by the image genre determination means.

5. A karaoke control system of claim 4, wherein the control means includes:

image genre number counting means for counting the number of image genres that are determined by the image genre determination means and that are different from one another;

comparing means for comparing the counted image genre number with a predetermined number that is obtained by subtracting the number of the common image genre from the number of the plurality of image data retrieval means; and retrieval control means for respectively controlling the image data retrieval means to retrieve image data from the image data groups of the determined image genres when the counted number is equal to or less than the predetermined number, and for respectively controlling the image data retrieval means of the predetermined number to retrieve image data from the image data groups of the determined image genres and for controlling the image data retrieval means of the number of the common image genre or less to retrieve image data from the image data groups of the common image genres when the counted number is greater than the predetermined number.

6. A karaoke control system of claim 5, wherein the plurality of image data memory means include a plurality of video disks storing a plurality of image data.

7. A karaoke control system of claim 6, wherein the plurality of image data retrieval means include a plurality of disk players for playing the plurality of video disks to reproduce images.

8. A karaoke control system of claim 7, wherein the transmitting means includes:
   a modem for modulating the retrieved song data into radio frequency song signals;
   a modulator for modulating the retrieved image data into radio frequency image signals; and
   a head amplifier for multiplexing the radio frequency song signals and the radio frequency image signals.

9. A karaoke control system of claim 8, wherein each of the plurality of karaoke devices further includes:
   a modem for receiving the radio frequency song signals and for demodulating the radio frequency song signals into song data; and
   a temporary memory for temporarily storing the song data demodulated by the modem.

10. A karaoke control system of claim 8, wherein the modulator modulates the retrieved image data of an image genre into radio frequency image signals of a channel,
   wherein the transmitting means further includes channel information transmitting means for informing the karaoke device of the channel, and
   wherein each of the plurality of karaoke devices further includes a tuner for operating to receive the channel for receiving the radio frequency image signals transmitted via the channel.

11. A karaoke control system for controlling a plurality of karaoke devices to play accompaniment music of desired songs while displaying lyrics of the desired songs and background images suitable for the desired songs, the karaoke control system comprising:
   a central control device and a plurality of karaoke devices connected to the central control device via a transmission line,
   wherein the central control device includes:
   a song data storing unit for storing song data for a plurality of songs, the song data for each song including music data representative of an accompaniment music of the corresponding song and lyric data representative of lyrics of the corresponding song, the song data being added with image genre data representative of an image genre most suitable for the corresponding song;
   a plurality of image data memories for storing a plurality of image data groups of a plurality of image genres, each group being formed from two or more sets of image data edited to represent images of a corresponding image genre, and at least one common image data group, each group being formed from two or more sets of image data edited to represent images of a corresponding common image genre that is common to several ones of the plurality of image genres; and
   a plurality of image data retrieval units for retrieving image data from the plurality of image data memories;
   wherein each of the plurality of karaoke devices includes a song selecting unit for selecting a song desired to be sung out of the plurality of songs,
   wherein the central control device further includes:
   a song data retrieving unit for retrieving song data for the songs selected at the karaoke devices from the song data storing unit;
   an image genre distinguishing unit for distinguishing image genres most appropriate for the selected songs, based on the image genre data added to the song data retrieved for the selected songs;
   a control unit for controlling the image data retrieval units to retrieve image data from the plurality of image data memories, the control unit controlling each of the image data retrieval unit to retrieve image data of an image data group of the distinguished image genre, the control unit compulsorily controlling at least one of the plurality of image retrieval units to retrieve image data of an image data group of a common image genre common to the distinguished image genre, regardless of what image genre is distinguished by the image genre distinguishing unit, when the number of image genres distinguished by the image genre distinguishing unit increases to a value close to the number of image data retrieval units; and
   a transmission unit for transmitting the retrieved song data and the retrieved image data to the karaoke devices.

12. A karaoke control system of claim 11, wherein the plurality of image data retrieval units are serially operated when various songs are selected by the plurality of karaoke devices.

13. A karaoke control system of claim 11, wherein each of the plurality of karaoke devices further includes:
   a music play unit for receiving the music data included in the transmitted song data and for playing accompaniment music based on the song data; and
   an image reproduction unit for receiving the lyric data included in the transmitted song data and the transmitted image data, for combining the lyrics represented by the lyric data and the images represented by the image data as background images, and for displaying the combined images.

* * * * *